(12) United States Patent
Blank

(10) Patent No.: US 11,259,462 B2
(45) Date of Patent: Mar. 1, 2022

(54) DELAY MANAGEMENT FOR GEOSPATIAL CROP YIELD MAPPING

(71) Applicant: Deere & Company, Moline, IL (US)

(72) Inventor: Sebastian Blank, Moline, IL (US)

(73) Assignee: DEERE & COMPANY, Moline, IL (US)

( * ) Notice: Subject to any disclaimer, the term of this patent is extended or adjusted under 35 U.S.C. 154(b) by 233 days.

(21) Appl. No.: 16/574,921

(22) Filed: Sep. 18, 2019

(65) Prior Publication Data

US 2021/0076569 A1 Mar. 18, 2021

Related U.S. Application Data

(63) Continuation of application No. 16/574,876, filed on Sep. 18, 2019.

(51) Int. Cl.
*A01D 41/127* (2006.01)
*G06Q 50/02* (2012.01)
*G06Q 10/04* (2012.01)
*G01F 1/30* (2006.01)

(52) U.S. Cl.
CPC .......... *A01D 41/1271* (2013.01); *G01F 1/30* (2013.01); *G06Q 10/04* (2013.01); *G06Q 50/02* (2013.01)

(58) Field of Classification Search
CPC .............................. G01F 1/30; A01D 41/1271
USPC .......................................................... 702/45
See application file for complete search history.

(56) References Cited

U.S. PATENT DOCUMENTS

| 9,903,979 | B2 | 2/2018 | Dybro et al. |
| 10,188,037 | B2 | 1/2019 | Bruns et al. |
| 2014/0129146 | A1* | 5/2014 | Romier ............. G01N 33/0098 702/5 |
| 2014/0358466 | A1* | 12/2014 | Foster .................. A01D 46/084 702/101 |
| 2017/0089742 | A1* | 3/2017 | Bruns ................ A01D 41/1273 |

OTHER PUBLICATIONS

Maertens, et al, "Design of a Dynamic Grain Flow Model for a Combine Harvester." Agricultural Engineering International: the CIGR Journal of Scientific Research and Development. Manuscript PM 01 005. vol. III.
Arslan, "A Grain Flow Model to Simulate Grain Yield Sensor Response." MDPI: Sensors. 8, 952, 962. Feb. 19, 2008.

* cited by examiner

*Primary Examiner* — Ricky Go
(74) *Attorney, Agent, or Firm* — Michael Best & Friedrich LLP

(57) ABSTRACT

Systems and methods for geospatial yield mapping by managing and modeling a system-based delay between crop location and crop sensing. The system stores a plurality of yield rate values indicative of crop yield detected by a sensor and a plurality of geospatial location values as time sequence data sets. The system then maps a yield rate value to a geospatial location value by determining an offset indicative of a total delay time from when the crop is cut from the field to when the crop is detected by the yield sensor. In some implementations, the delay value is determined as an integer multiple of a defined sampling frequency and is determined as a sum of a plurality of delay component values each indicative of a portion of the total delay time associated with a different one of a plurality of component systems of the crop harvester.

11 Claims, 5 Drawing Sheets

DELAY MANAGEMENT FOR GEOSPATIAL CROP YIELD MAPPING

BACKGROUND

The present invention relates to systems and methods for tracking crop yield while harvesting. More specifically, at least some of the systems and methods described herein relate to systems that are used to track crop yield by geospatial location.

SUMMARY

In one embodiment, the invention provides a method of correcting a correlation between a geospatial location of a crop harvester and a determined yield rate value. A sequence of delay values is determined (for example, by an electronic processor). Each delay value of the sequence of delay values is indicative of a total time delay from a time that a crop is cut from a field as the harvester moves across the field to a time that the crop reaches the field of view of a yield monitoring sensor. Each delay value in the sequence of delay values is determined by determining one or more static delay components, determining one or more dynamic delay components, and determining the total delay time based at least in part on the static and dynamic delay components (e.g., by summing the individual delay components). The static delay components are indicative of portions of the total time delay that are constant or that can be determined based on instantaneous measured outputs of one or more sensors (e.g., current operating conditions of the harvester). The dynamic delay components are indicative of portions of the total time delay that are dependent on historical operating conditions of one or more components of the harvester. Based on a determined delay value of the sequence of determined delay values, a determined crop yield value is correlated to a determined geospatial location. The crop yield value is selected from a first stored data set indicative of a plurality of determined crop yield values (each at a different time) and the geospatial location is selected from a second stored data set indicative of a plurality of determined geospatial locations (each at a different time).

In another embodiment, the invention provides a geospatial mapping system for a sugar cane harvester. The sugar cane harvester includes a chopper positioned at the front end of the sugar cane harvester, a buffer basket configured to receive chopped sugar cane crop from the chopper, and an elevator configured to convey the chopped sugar cane crop from the buffer basket to a collection vessel. The mapping system includes a positioning system, a yield monitoring sensor, and an electronic controller. The yield monitoring sensor is positioned with a field of view that includes at least a portion of the elevator and is configured to generate an output indicative of an amount of chopped sugar cane crop conveyed on the elevator. The electronic controller is configured to periodically determine a geospatial location of the sugar cane harvester based on the output of the positioning system at a first sampling frequency and to store to a memory a first sequential data set including a plurality of determined geospatial locations at each sampling period of the first sampling frequency. The controller is also configured to periodically determine a sugar cane output value based on the output of the yield monitoring sensor at a second sampling frequency and to store to the memory a second sequential data set including a plurality of determined sugar cane output values at each sampling period of the second sampling frequency. The controller is further configured to determine a sequence of delay values each indicative of a total time delay from a time that the sugar cane crop is cut from the field to a time that the sugar cane crop reaches the field of view of the yield monitoring sensor. The system is configured to correlate one or more determined sugar cane output values of the plurality of determined sugar cane output values each to a different one of the plurality of determined geospatial locations based on the sequence of determined delay values.

In some embodiments, the total delay time is determined based at least in part on one or more determined static delay components and one or more determined dynamic delay components. The static delay components are indicative of portions of the total time delay that are constant or that can be determined based on instantaneous measured outputs of one or more sensors. The dynamic delay components are indicative of portions of the total time delay that are dependent on historical operating conditions of one or more components of the sugar cane harvester. For example, one static delay component includes a chopper delay indicative of a time delay from the time that the sugar cane crop is cut to a time that the sugar cane crop reaches the buffer basket. An example of a dynamic delay component includes a buffer basket delay indicative of a time delay form the time that the sugar cane crop reaches the buffer basket to a time that the sugar cane crop is removed from the buffer basket by the elevator—the controller is configured to determine the buffer basket delay based at least in part on a current operating state of the elevator and a previous operating state of the elevator.

In yet another embodiment, the invention provides a method of correcting a correlation between a geospatial location of a crop harvester and a determined yield rate value. A delay value is determined (for example, by an electronic processor) that is indicative of a total delay time from a first time to a second time—the first time being when a crop is cut from a field by the crop harvester as the crop harvester moves along a surface of the field and the second time being when the cut crop reaches a yield monitoring sensor. The delay value is determined as an integer multiple and is determined as a sum of a plurality of delay component values each indicative of a portion of the total delay time associated with a different one of a plurality of component systems of the crop harvester. At least one delay component value of the plurality of delay component values is calculated based on a sensed operating condition of the crop harvester. A first yield rate value is then correlated with a geospatial location on the field based at least in part on the determined delay value as an integer offset. The first yield rate value that is correlated with the geospatial location is selected from a sequential data set of yield rate values that have each been periodically determined based on an output from the yield monitoring sensor at each of a plurality of sampling interval times according to a defined sampling frequency.

In some such embodiments, the method further includes comprising determining, by the electronic processor, a plurality of delay values at the defined sampling rate based at last in part on one or more sensed operating conditions of the crop harvester at each sampling interval time according to the defined sampling rate, and wherein correlating the first yield rate value with the geospatial location includes identifying a sampling interval time of the plurality of sampling interval times corresponding to the first yield rate value, identifying a first geospatial location from a second sequential data set corresponding to the first sampling interval time, wherein the second sequential data set includes a plurality of geospatial locations of the crop harvester determined at each sampling interval time according to the defined sampling frequency, identifying a second geospatial location from the second sequential data set that is offset from the first geospatial location in the second sequential data set by the integer offset defined by the delay value for the first sampling interval time, and updating a stored yield map identifying the first yield rate value as a yield rate value for the second geospatial location.

In some such embodiments, the crop harvester includes an elevator configured to convey the crop to a collection vessel, the yield monitoring sensor is configured to detect measure an amount of crop passing a location on the elevator, and the plurality of delay component values includes an elevator delay component indicative of an amount of time that the crop is moving on the elevator before it is sensed by the yield monitor sensor. The elevator delay component is then determined based at least in part on a current speed of the elevator.

In some such embodiments, the crop harvester includes a buffer basket configured to receive material collected by the crop harvest and an elevator configured to convey the crop from the buffer basket to a collection vessel. The plurality of delay component values includes a buffer basket delay component indicative of an amount of time that the crop is held in the buffer basket before being removed from the buffer basket by the elevator and the buffer basket delay component is determined based at least in part on a current operating state of the elevator and a previous operating state of the elevator. In some embodiments, the buffer basket delay component is determined also based at least in part on a current speed of the elevator and/or an estimated mass flow rate. The estimated mass flow rate is indicative of the rate at which material is entering the buffer basket and is determined based at least in part on a sensed ground speed of the crop harvester.

In still another embodiment, the invention provides a geospatial yield mapping system for a crop harvester. The system stores a plurality of yield rate values as a sequential data set by periodically determining a yield rate value at each sampling interval time of a plurality of sampling interval times according to a defined sampling frequency. The system includes an electronic processor configured to determine the yield rate based on an output of a yield monitoring sensor at each sampling interval time. The system is also configured to determine a delay value indicative of a total delay time from a first time (when the crop is cut from the field by the crop harvester) to a second time (when the same crop moves through the mechanisms of the crop harvester and reaches the yield monitoring sensor). The delay value is determined as an integer multiple of the defined sampling frequency and is determined as a sum of a plurality of delay component values each indicative of a portion of the total delay time associated with a different one of a plurality of component systems of the crop harvester. At least one delay component value of the plurality of delay component values is calculated based on a sensed operating condition of the crop harvester. The system then correlates a first yield rate value from the sequential data set of yield rate values with a geospatial location on the field based at least in part on the determined delay value as an integer offset.

In some such embodiments, the electronic controller is further configured to determine a plurality of delay values at the defined sampling rate based at least in part on one or more sensed operating conditions of the crop harvester at each sampling interval time according to the defined sampling rate; and store a plurality of geospatial locations as a second sequential data set by periodically determining a geospatial location of the crop harvester at each sampling interval time according to the defined sampling frequency. The electronic controller is also configured to correlate the first yield rate value with a geospatial location by identifying a sampling interval time of the plurality of sampling interval times corresponding to the first yield rate value, identifying a first geospatial location from the second sequential data set corresponding to a first sampling interval time, identifying a second geospatial location from the second sequential data set that is offset from the first geospatial location in the second sequential data set by the integer offset defined by the delay value for the first sampling interval time, and storing a yield map identifying the first yield rate value as a yield rate value for the second geospatial location.

In some such embodiments, the crop harvester includes an elevator configured to convey the crop to a collection vessel, and the yield monitoring sensor is configured to measure an amount of crop passing a location on the elevator. The plurality of delay component values includes an elevator delay component indicative of an amount of time that the crop is moving on the elevator before it is sensed by the yield monitor sensor. The electronic controller is further configured to determine the elevator delay component based at least in part on a current speed of the elevator.

In some such embodiments, the crop harvester includes a buffer basket configured to receive material collected by the crop harvest and an elevator configured to convey the crop from the buffer basket to a collection vessel. The plurality of delay component values includes a buffer basket delay component indicative of an amount of time that the crop is held in the buffer basket before being removed from the buffer basket by the elevator. The electronic controller is further configured to determine the buffer basket delay component based at least in part on a current operating state of the elevator and a previous operating state of the elevator. In some embodiments, the electronic controller is configured to determine the buffer basket delay component based at least in part on a current speed of the elevator and/or an estimated mass flow rate. The estimated mass flow rate is an estimated amount of material entering the buffer basket and, in some embodiments, is determined by the electronic controller based at least in part on a sensed ground speed of the crop harvester. In some such embodiments, the electronic controller is further configured to store a plurality of estimated mass flow rates as a sequential data set by periodically determining an estimated mass flow rate of material entering the buffer basket at each sampling interval time of the plurality of sampling interval times according to the defined sampling frequency. The electronic controller is configured to determine the estimated mass flow rate at each sampling interval time based on a sensed ground speed of the crop harvester at that sampling interval time, and is configured to determine the buffer basket delay component based at least in part on a plurality of estimated mass flow rates from the sequential data set.

In some such embodiments, the crop harvester includes a chopper positioned at a front end of the crop harvester configured to cut the crop from the field as the crop harvester moves along the surface of the field and to chop the cut crop, and the plurality of delay component values includes a chopper delay component indicative of an amount of time from when the crop is cut from the field to when the crop exits the chopper. In some embodiments, the electronic controller is further configured to calculate the chopper delay component based at least in part on a sensed ground speed of the crop harvester. In some embodiments, the electronic controller is further configured to determine an estimated mass flow rate of material exiting the chopper; and calculate the chopper delay component based at least in part on the estimated mass flow rate. In some embodiments, the electronic controller is configured to determine the estimated mass flow rate based at least in part on a ground speed of the crop harvester and a sensed chopper pressure indicative of at least one selected from a group consisting of a pressure resistance of the chopper while cutting the crop from the field and a pressure resistance of the chopper while chopping the cut crop.

In some such embodiments, the plurality of delay component values includes at least one static delay component and at least one dynamic delay component, wherein the electronic controller is further configured to calculate the at least one dynamic delay component based at least in part on a current value of a sensed operating condition of the crop harvester and at least one previously value of the sensed operating condition. In some embodiments, the at least one static delay component is constant. In some embodiments, the electronic controller is further configured to calculate the at least one static delay component based on a current value of a sensed operating condition of the crop harvester and not based on historical values of any sensed operating conditions.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
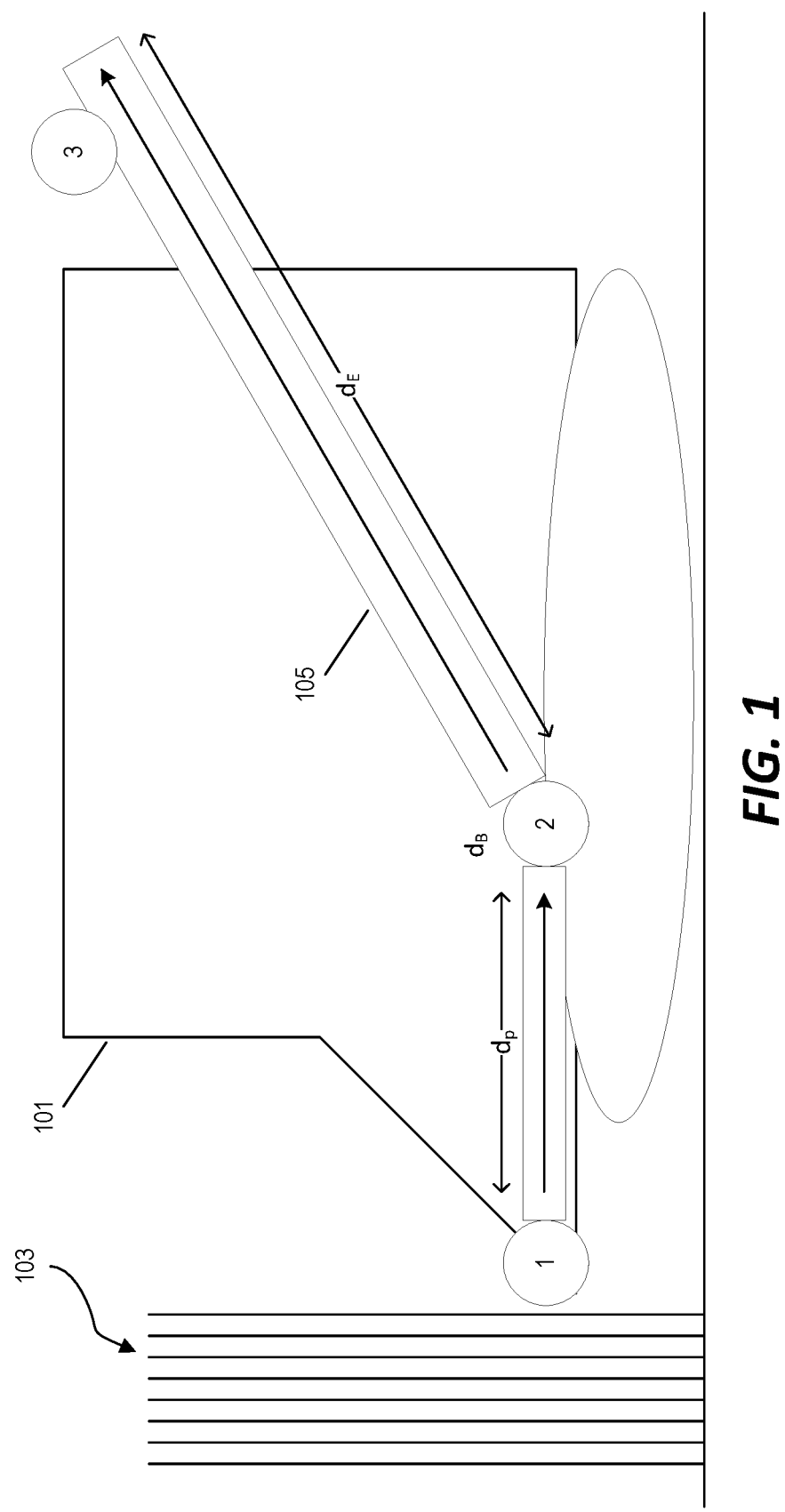
FIG. 1 is a schematic diagram of sugar cane moving through a sugar cane harvester according to one embodiment.

Machine equipment such as a combine harvester are used to collect crops growing in a field and, in some cases, to perform some initial processing of the collected crop as it passes through the various component systems of the machine. FIG. 1 illustrates an example of the various component systems of a sugar cane harvester 101 through which sugar cane crop passes as it is collected from the field. The sugar cane harvester 101 is operated as a vehicle moving along a surface of a field in which sugar cane crop 103 is growing. A first component system of the sugar cane harvester 101 is a base cutter and chopper (collectively referred to in FIG. 1 by reference numeral (1)) positioned at a front end of the sugar cane harvester 101. Together, the base cutter and chopper (1) cuts the crop in front of the sugar cane harvester 101, pulls the cut crop into the machine, and chops the cut crop into segments of approximately equal length. After passing through the chopper (1), the resulting mix of sugar cane billets, leaf fragments, soil particles, root balls, and other components enters an intermediate holding vessel referred to herein as a "buffer basket" (2). An elevator 103 draws material from the buffer basket (2) and conveys it to the top of the elevator 105 where it is deposited into a collection vessel (e.g., a tractor and wagon travelling alongside the sugar cane harvester 101.

In the example of FIG. 1, the elevator 105 can be actuated independent of the other harvest functions of the sugar cane harvester 101. In some situations, the elevator 105 can be temporarily slowed or stopped until the buffer basket (2) is entirely filled (e.g., for up to 30 seconds). In some implementations, the speed of the elevator 105 is not necessarily synchronized with the groundspeed of the sugar cane harvester 101. In some implementations, the speed of the elevator 105 and the operating state of the elevator (i.e., whether the elevator is currently turned on or off) is controlled manually by an operator of the sugar cane harvester 101.

Positioned near the top of the elevator 105 in the example of FIG. 1 is a stereo camera system configured to operate as a yield monitoring sensor (3). Although the yield monitoring sensor (3) in the example of FIG. 1 is described as a camera system, other types of yield monitoring sensor may be used in other implementations in addition to or instead of a camera-based yield monitoring sensor. For example, a yield monitoring sensor (3) in some implementations might be configured to measure a deflection or tension of the elevator belt using strain gauges. Alternatively, the yield monitoring sensor (3) may be configured to measure a motor torque or current of the motor driving the elevator belt as a proxy for mass with respect to a gravity vector. In still other implementations, a yield monitoring sensor (3) may be adapted to rely on elements in the front of the machine including, for example, feed roll displacement or a forward-looking camera positioned & configured to monitor crop standing in front of the machine and to estimate yield based on images of the crop before it is cut and chopped.

Returning now to the example of FIG. 1, the stereo camera of the yield monitoring sensor (3) is positioned above the elevator 105 facing downward with a field of view that includes at least a portion of the surface of the elevator conveyor. The yield monitoring sensor (3) may also include an artificial light source (e.g., for night operation). The yield monitoring sensor (3) captures image data that is processed to provide volumetric estimations of amounts of crop passing by on the elevator along with image classification data to estimate additional metrics such as, for example, leaf trash content, billet content, and other components (e.g., root balls, etc.). The output of the yield monitoring sensor (3) can be used to determine an absolute amount of crop passing along the elevator 105 over a period of time and/or, in some implementations, to estimate a crop yield rate corresponding to a particular time period.

Because crop growth in a field is not always uniform, the crop yield rate detected by the yield monitoring sensor (3) can vary as the sugar cane is harvested. To enable the use of data for documentation, agronomics, and other purposes, yield monitoring systems may be configured to accurately track a true location from which harvested crop originated.

In other words, systems may be configured to map relative or absolute amounts of crop yield (or rates of crop yield) to different geospatial locations within the same field based on the output of the yield monitoring sensor (3). Proper geospatial yield mapping enables a farmer to adjust practices to environmental and soil properties and to ultimately help an operation to be more profitable by adopting effective location-specific Ag-management practices.

However, although the yield monitoring sensor (3) is able to use captured image data for relatively accurate determinations of crop yield, the yield monitoring sensor (3) is not able to measure crop yield immediately as the crop is cut from the field. As illustrated in FIG. 1, the crop must pass through various different component systems of the sugar cane harvester after it is cut from the field before it is reaches the field of view of the yield monitoring sensor (3) where it can be detected in the image data. For example, after the sugar cane crop is cut from the field, it is processed by the chopper (1) before it reaches the buffer basket (2) (shown in FIG. 1 as "processing delay" $d_p$). The crop will then remain in the buffer basket (2) for a period of time until it is drawn from the buffer basket (2) by the elevator 105 (shown in FIG. 1 as "buffer delay" dB). Once removed from the buffer basket (2), the crop must travel a distance along the conveyor of the elevator 105 before it reaches the field of view of the yield monitoring sensor (3) (shown in FIG. 1 as "elevator delay" $d_E$). Each of these stages introduces a delay component that contributes to the total aggregate delay between the time that the crop is cut from the field and the time that the crop is detected by the yield monitoring sensor (3).

Because the sugar cane harvester 101 continues to travel along the surface of the field as the crop is collected and processed (as shown in FIG. 1), the geospatial location of the sugar cane harvester 101 at the time when the crop is measured by the yield monitoring sensor (3) is not the geospatial location from which the measured crop originated. The proper geospatial attribution of the yield monitor measurements requires a delay mechanism for correlating a measurement of crop yield to a measurement of geospatial location. One option for a delay mechanism is to assume an overall static delay adjusted in a time-discrete fashion (i.e., a shift of sampled vectors relative to each other). However, a static delay model is not able to account for variables including, for example, buffer effects and relative speed difference between the elevator speed and the ground speed.

Another option is to apply post-processing techniques to match patterns in the geospatial data among adjacent "passes" of the sugar cane harvester along the field surface as the sugar cane harvester moves across the field in any of a variety of different cutting patterns/techniques (including, for example, a racetrack pattern or cutting-from-face (i.e. parallel paths)). Although this may provide some improvement in precision over a static delay approach, this qualitative approach fails to address specific system characteristics as it still inherently assumes a static delay model and attempts to minimize the mean error between adjacent passes. Therefore, although the resulting yield maps may look more uniform (as they filter output deviations and artifacts that might be more easily identifiable by the human eye), the resulting yield maps are not necessarily more accurate than the open-loop static delay model discussed above.

Yet another option is to model the full system behavior and to explicitly account for how the different component systems of the sugar cane harvester 101 contribute to the total delay based on the actual current and, in some cases, historic operational states of the sugar cane harvester 101. This approach is able to "decode" the temporal convolution of signals and to account for a "memory effect" (for example, due to accumulation of material in the buffer basket (2)) by tracking inputs, outputs, and operating states explicitly.

The examples described below provide for geospatial attribution of the yield monitoring measurements by implementing a robust delay model that decomposes the overall delay into its constant and variable components that can be parameterized with a mix of onboard measurements and a priori assumptions determined by detailed engineering knowledge of the system. This mathematical model is mapped into a system design that can be implemented onboard the vehicle (i.e., to provide a "live correction" at the source using embedded processing) or in a remote server (i.e., to provide "post correction" based on submitted data streams (e.g., in a cloud environment)). In some implementations, "live-corrected" yield mapping data is used by the sugar cane harvester 101 for automated or semi-automated operational features of the sugar cane harvester 101. In some implementations, corrected yield mapping data (whether live-corrected or post-corrected) can be used for documentation of crop yield.

Figure 2:
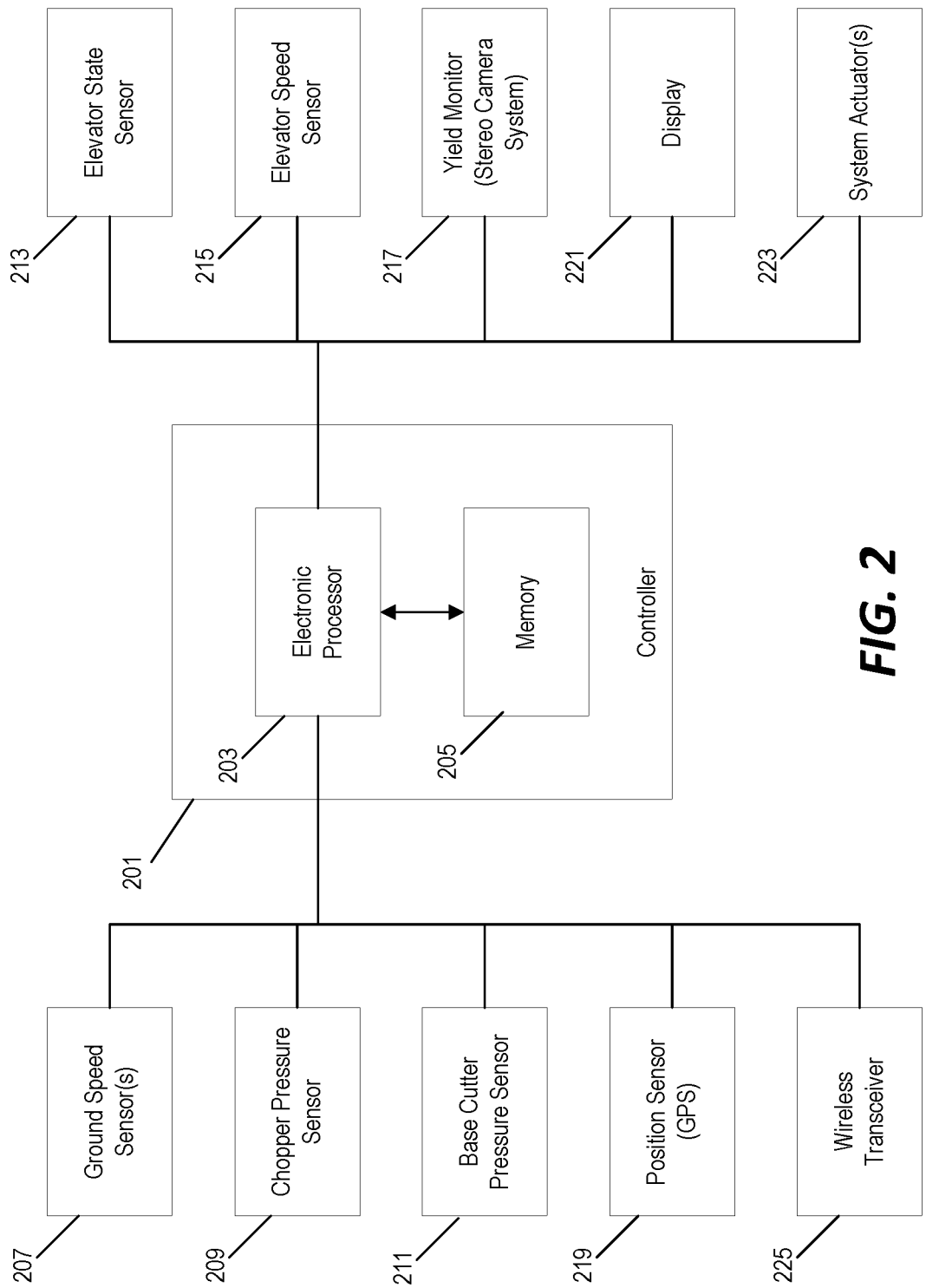
FIG. 2 is a block diagram of a control system for geospatial yield mapping of sugar cane crop collected by the sugar cane harvester of FIG. 1.

FIG. 2 illustrates an example of a control system for the sugar cane harvester 101 of FIG. 1. A controller 201 includes an electronic processor 203 and a computer-readable, non-transitory memory 205. The memory 205 is configured to store data (e.g., data received from sensors, generated yield maps, etc.) and computer-executable instructions. The electronic processor 203 is communicatively coupled to the memory 205 and is configured to read and store data to the memory 205. The electronic processor 203 is also configured to access and execute computer instructions stored on the memory 205 to provide the functionality of the controller 201 (including the functionality described herein). The controller 201 can be physically mounted to the sugar cane harvester 101 or, in some implementations, provided as a remotely located computer system or server configured to wirelessly communicate with a local controller of the sugar cane harvester 101 and/or other individual components of the sugar cane harvester 101. In some implementations, the functionality of the controller 201 as described herein may be distributed between multiple different controllers including, for example, a local controller and a remote computer system (e.g., a remote server computer) in wireless communication with each other.

As illustrated in FIG. 2, the controller 201 is communicatively coupled to a plurality of different sensors including, for example, a ground speed sensor 207 (configured to measure a ground speed of the sugar cane harvester 101), a chopper pressure sensor 209 (configured to measure a pressure exerted by the chopper against a cut crop), a base cutter pressure sensor 211 (configured to measure a pressure exerted by the base cutter of the sugar cane harvester 101 while cutting crop from the field), a position sensor 219 (e.g., a GPS system) (configured to determine a geospatial location of the sugar cane harvester 101), an elevator state sensor 213 (configured to sense or otherwise indicate whether the elevator 105 is in an on state or an off state), an elevator speed sensor 215 (configured to measure a current operating speed of the elevator 105), and a yield monitor sensor 217 (e.g., the stereo camera system (3) discussed above in reference to FIG. 1). The controller 201 is configured to receive an output signal from each of these sensors through one or more wired or wireless interfaces. In some implementations, the controller 201 is configured to receive the output signal from one or more of the sensor directly and, in some implementations, the controller 201 is coupled to one or more of the sensors via a controller area network (CAN) bus and is configured to receive the output signals from the one or more sensors via the CAN bus.

In the example of FIG. 2, the controller 201 is also communicatively coupled to a display screen 221 (e.g., a liquid crystal display (LCD)) positioned either in the cab of the sugar cane harvester 101 or remotely. The controller 201 is configured to cause the display screen 221 to output data in text and/or graphical format. For example, the controller 201 may be configured to cause the display screen 221 to display to the user a numerical indication of a current yield rate, a current geospatial location, a current ground speed, and/or a current elevator speed. In some implementations, the controller 201 may be configured to cause the display screen 221 to display a yield map for the field in graphical format in near real-time. In some implementations, the controller 201 may be configured to cause the display screen 221 to show a "machine model" that includes, for example, the GPS receiver mounting offset with respect to a front end of the harvester and other information like a user-defined delay adjustment (static and/or fixed).

In the example of FIG. 2, the controller 201 is also communicative coupled to one or more systems actuators 223. In some implementations, the controller 201 is configured to receive an output signal from one or more system actuators 223 indicative of a current actuator state including, for example, a current engine speed, current operating settings of the elevator, and current operating settings of the cutter/chopper. In some implementations, the controller 201 is also configured to transmit control signals to the one or more actuators 223 to alter or control the operation of the system actuators 223. For example, in some implementations, the controller 201 may be configured to automatically adjust the operation of the elevator, the chopper/cutter, or the power train of the sugar cane harvester 101 based on the received output signals from the sensors and/or based on the determined yield map for the field.

Lastly, the controller 201 in the example of FIG. 2 is communicatively coupled to a wireless transceiver 225 for wireless communication with one or more other computer-based systems including, for example, a remote server computer.

Figure 3:
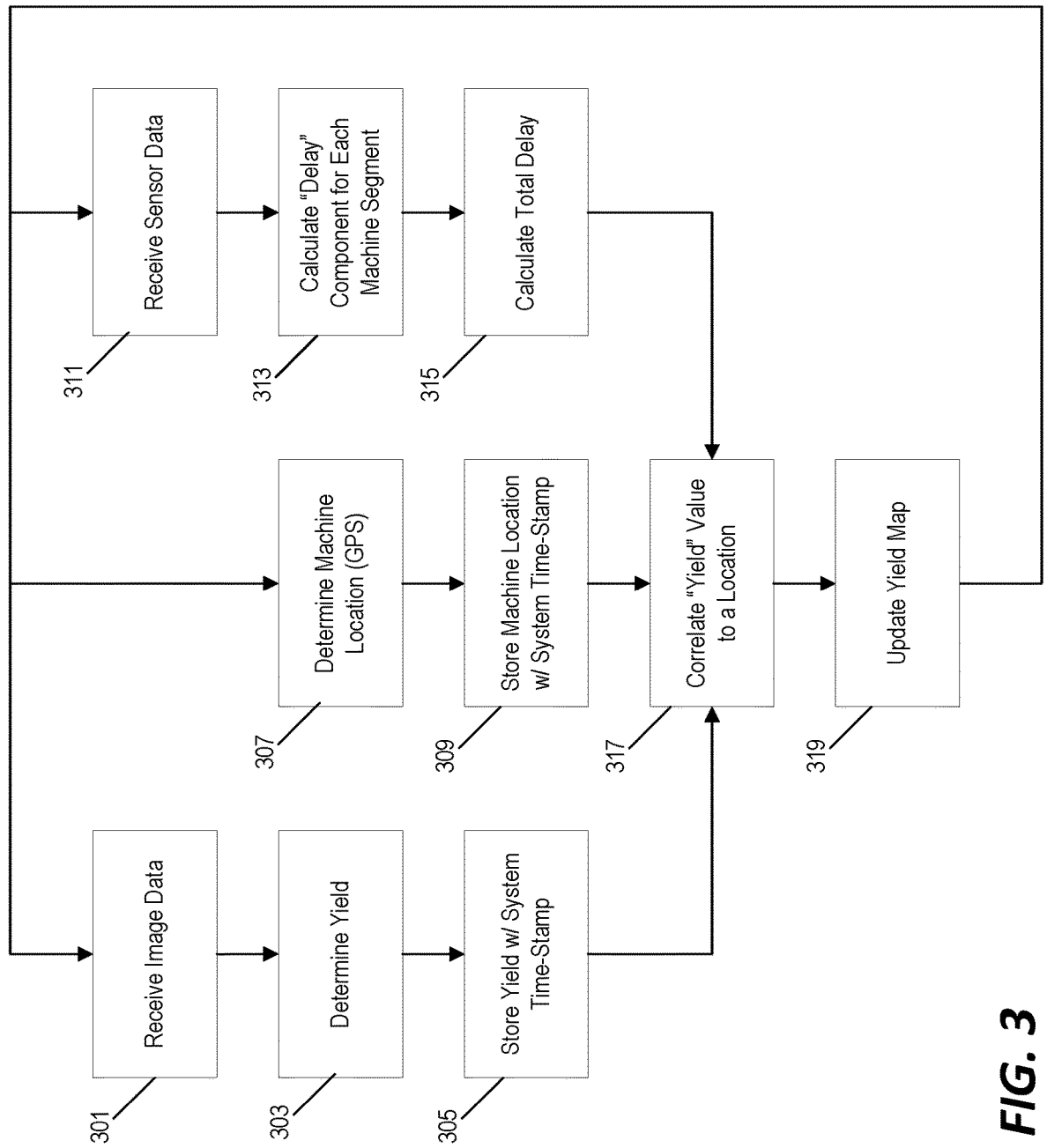
FIG. 3 is a flowchart of a method for mapping sugar cane yield to geospatial locations using the control system of FIG. 2.

FIG. 3 illustrates a method for generating a yield map for a field using the control system of FIG. 2 by concurrently and periodically monitoring the crop yield, determining the geospatial location of the sugar cane harvester 101, and determining a total delay component. The total delay component is then used to correlate a determined crop yield value with a determined geospatial location.

As discussed above, the controller 201 receives image data from the yield monitor sensor 217 indicative of crops passing the yield monitor sensor 217 on the elevator 105 (step 301). Based on the captured image data, the controller 201 determines a current "yield" (step 303). In some implementations, the controller 201 is configured to periodically determine the current yield based on one or more camera images captured at a single moment in time. In other implementations, the controller 201 is configured to determine to determine a yield amount for a defined period of time by analyzing a sequence of images captured by the yield monitor sensor 217 over the defined period of time. Once a new "current" yield value is determined by the controller 201, the yield value is stored to the memory 205 with a system time-stamp (step 305) as discussed in further detail below.

The controller 201 is also configured to periodically determine a geospatial location of the sugar cane harvester 101 based on the output from the GPS (step 307). The determined geospatial location is also stored to the memory 205 with a system time-stamp (step 309).

The controller 201 is also configured to periodically determine a total delay. The controller 201 receives sensor data from one or more sensors (step 311) and calculates a "delay component" for each of a plurality of different machine segments (or sub-systems) (step 313) including, for example, a chopper delay component, a buffer basket delay component, and an elevator delay component. The total delay is calculated by the controller 201 as a sum of the different delay component (step 315). After the total delay is calculated, the controller 201 uses the total delay to correlate a "yield" value to a geospatial location (step 317) and the output yield map is updated based on the correlation.

The method of FIG. 3 is repeated to generate a yield map that includes a determined yield value for each of a plurality of different geospatial locations. In some implementations, the yield map is generated as a "spreadsheet"-type format including a listing of geospatial locations and a corresponding yield value for each geospatial location. The yield map may then be displayed (e.g., on the display 221) either textually (as a listing of yield values for each geospatial location) or graphically (e.g., using color-coding to indicate different yield values for each different geospatial location on a two- or three-dimensional representation of the field surface).

In some implementations, the controller 201 is configured to store all of the determined yield values, geospatial locations, and total delay values for the entire field surface. In other implementations (as discussed in further detail below), the controller 201 is configured to utilize a set of circular arrays that are each configured to store a defined number of determined values such that when a new value is determined and stored to the circular array, the oldest determined value in the array is overwritten by the newly determined value. In still other implementations, the controller 201 may be configured to not store/track determined values for all three of the yield values, geospatial values, and total delay values. For example, the controller 201 may be configured to temporarily store multiple determined geospatial location values and, each time a new yield value and total delay value is determined, the new yield value is matched to one of the previously stored geospatial location values. When a geospatial location value is matched to a yield value and added to the yield map, that geospatial location value and any previously determined geospatial location values are removed from the temporarily stored set of geospatial location values (so that the temporary stored includes only geospatial location values that might still be matched to a yield value).

In some implementations, the yield value, the geospatial location, and the total delay are calculated at the same sampling times based on the same sampling frequency. In other implementations, the yield value, the geospatial location, and/or the total delay may be determined at different sampling frequencies. In some such implementations, those different sampling frequencies can be defined statically while, in other such implementations, the sampling frequencies may be adjusted dynamically to ensure that yield values are determined for each determined geospatial location (or vice versa). For example, if the determined delay time begins to decrease, the controller 201 may be configured to increase the sampling frequency of the yield monitor to ensure that yield values are available for each determined geospatial location as the delay/offset between those two determined values decreases.

In some implementations, the controller 201 is configured to generate the yield map by matching a plurality of geospatial locations each with only a single yield value in a one-to-one manner. In other implementations, the controller 201 is configured to determine a yield value for each individual geospatial location based on multiple determined yield values and/or to determine yield values for multiple different geospatial locations based on only a single determined yield value. For example, if the determined delay value increases, multiple different determined yield values might correlate to the same geospatial location. Accordingly, the controller 201 may be configured to determine an actual yield value for the geospatial location in the yield map based on a sum and/or average of all of the different yield values that correlate to that same geospatial location. Similarly, as the delay value decreases, there may be situations where one or more determined geospatial locations have no correlated yield value. Accordingly, the controller 201 may be configured to determine a yield value for the geospatial location in the yield map based on one or more determined yield values that have been correlated to adjacent geospatial locations.

In some implementations, the total delay is calculated as a decimal value indicative of an actual time delay from the time that the sugar cane harvester 101 was located at a particular geospatial location to the time when the crop cut from the field at that particular geospatial location is within the field of view of the yield monitor 217. In some such implementations, the controller 201 is then configured to correlate a geospatial location value to a yield value by identifying a geospatial location value and a yield value with timestamps that most closely match when offset by the determined time delay. However, in other implementations, the total delay time (and each delay component) are determined as integer offsets based on the sampling frequency.

Figure 4:
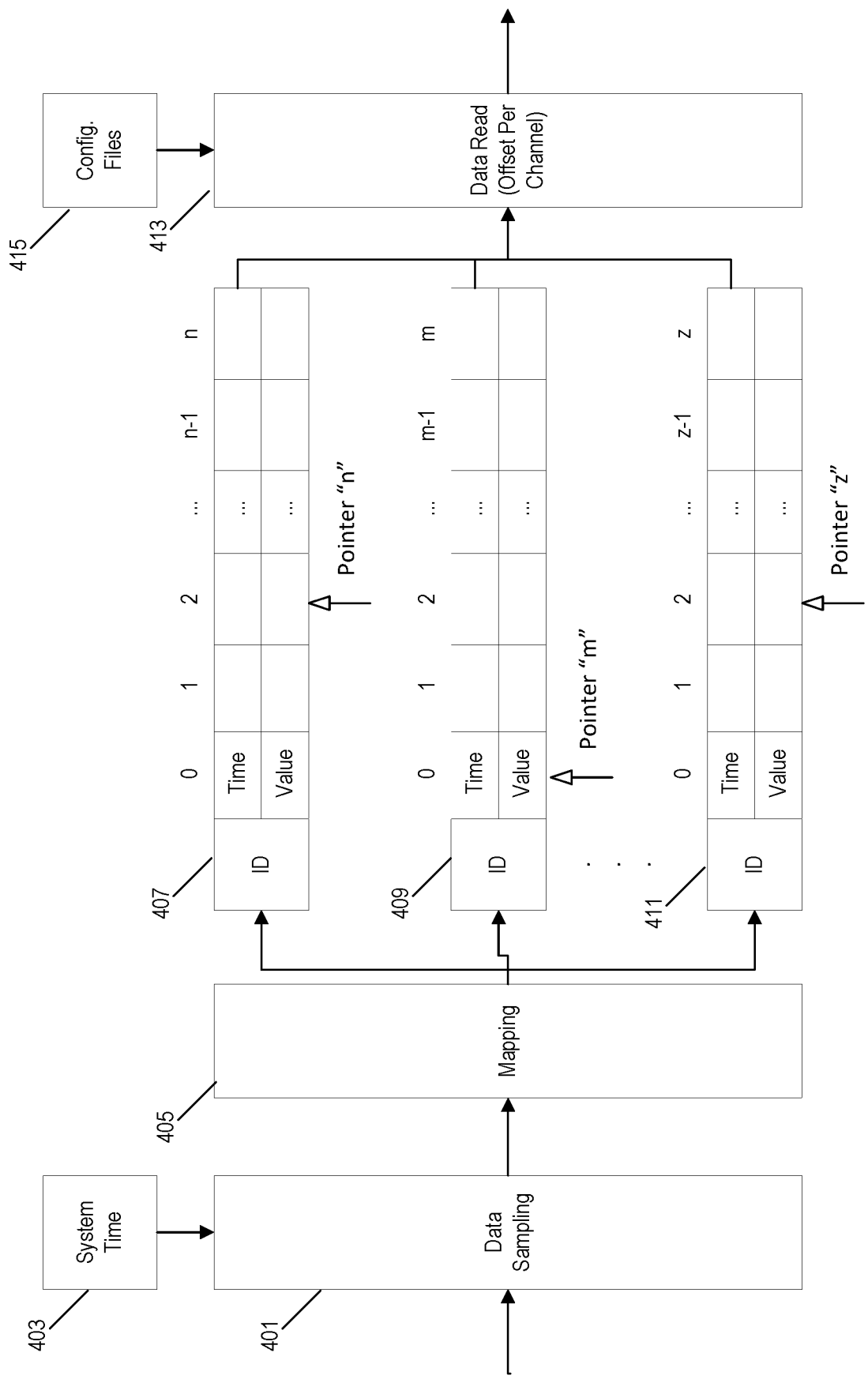
FIG. 4 is a schematic flowchart of a mechanism for correlating sugar cane yield values to geospatial locations using pointer management.

FIG. 4 illustrates a specific example for generating a yield map using the method of FIG. 3. In this example, the controller 201 performs data sampling (step 401) to periodically determine the yield value, the geospatial location, and the total delay according to a single sampling frequency such that, at each sampling interval time, all three values are determined. At each sampling interval, the controller 201 reads the current system time (step 403) to map a time-stamp to each determined value (step 405). The output of this time-stamp mapping 405 is a set of circular buffers 407, 409, 411. Each circular buffer is provided as an array of a defined length. Circular buffer 407 is a 2×n array configured to store n determined values and a time-stamp for each, circular buffer 409 is a 2×m array configured to store m determined values and time stamp for each, and circular buffer 411 is a 2×z array configured to store z determined values and a time stamp for each. Each time a new value is determined (based on the applicable sampling frequency), it is stored to the corresponding circular buffer 407, 409, 411 as a time sequence overwriting the oldest determined value currently stored in that circular buffer.

Although the example of FIG. 4 shows three different circular buffers, other implementations may include more or fewer. Furthermore, in some implementations, the array length of two or more of the circular buffers may be the same. For example, array length n of circular buffer 407 may be the same as the array length m of circular buffer 409. In some implementations, all of the circular buffers may have the same array length. Also, although the circular buffers 407, 409, 411 of FIG. 4 are described as having a defined length, in some implementations, the circular buffers 407, 409, 411 can be replaced with arrays that are large enough to store all of the determined values for the entire field or, in still other implementations, may include arrays of indefinite length such that that size of the array is increased as each new determined value is added at each subsequent sampling interval. Furthermore, although the example of FIG. 4 illustrates each circular buffer as including a sequential data set for only a single data value, in some implementations, the system is configured to treat individual "buffers" as "delay groups" that store multiple sensed/measured values as each time-step in the sequential data set where all of the values in a single "delay group" would require the same delay adjustment. Thus, as described below, the delay offset for the entire "delay group" could be determined by calculating a single delay value instead of separately calculating delay values for each individual sensed/measured value.

To generate/update the yield map, data is read from each circular buffers (step 413) by applying a data offset to each circular buffer based, for example, on the determined delay value and, in some implementations, system configuration data stored to the memory 205 in one or more configuration files 415.

In a specific example, the controller 201 may be configured to store a time series of determined "yield values" in the first circular buffer 407 and to store a time series of determined geospatial location values in the second circular buffer 409. The controller 201 is also configured to store time series of various different sensor outputs to other additional circular buffers. The controller 201 is then configured to identify a pair of values (i.e., one yield value and one geospatial location value) that correlate to each other by determining a pointer offset indicative of the total delay time. In this example, the controller 201 may be configured to identify a "yield value" in the first circular buffer 407 by setting a pointer to a location in the first circular buffer 407 (i.e., Pointer "n") based on a particular time stamp. The controller 201 would then determine an offset indicative of the total delay time based on the other sensor output values stored to the additional circular buffers and data stored in the system configuration files 415. For example, in FIG. 4, the integer offset determined by the controller 201 indicative of the total delay time for the yield value in the location of Pointer "n" was two ("2") (i.e., 2× the sampling interval defined by the sampling frequency). Accordingly, the location of Pointer "m" is offset from the location of Pointer "n" by two positions in the arrays.

As mentioned above and as described in further detail below, for some delay components of the total delay value are based on a single value of one or more sensor outputs while some other delay components are determined based on additional historical sensor output data. Accordingly, in some implementations, the controller 201 is further configured to determine appropriate pointer locations to the other circular buffers to identify data stored in those additional circular buffers that will be used to determine the "total delay" value (i.e., the offset between Pointer "n" and Pointer "m").

Furthermore, in some implementations, the controller 201 may be further configured to determine other output values in addition to the "yield value." In some such implementations, the controller 201 may be configured to store these additional determined values as time sequence data sets in one or more additional circular buffers. These additional determined values can then be correlated to geospatial location values by determining an applicable offset based on the sensor data. In some implementations, the offset for the additional determined value may be the same as the offset for the "yield value." However, in other implementations, the total delay time between the time when the sugar cane harvester 101 was located at the geospatial location and the time that the additional value was sensed may be different from the total delay time for the yield monitor sensor. Accordingly, in some implementations, the controller 201 may be configured to calculate different delay values for each of these different time sequences of determined values.

In the example described above in reference to FIG. 4, the controller 201 is configured to store sensor values and system operating state values to the circular buffers and to calculate the offset indicative of the total delay time based on the store data during the "data read" step 413. However, in some implementations, the controller 201 may be configured to calculate the offset indicative of the total delay at the same sampling frequency as the determined geospatial location and the determined yield amount and, therefore, may be configured to store the determined delay values as a time sequence data set in one of the circular buffers and to then access the stored delay values from the circular buffer when correlating a yield value with a geospatial location value.

Accordingly, by storing the geospatial location values, the yield values, other values indicative of sensed operating conditions of the sugar cane harvester 101, and/or determined total delay values as multiple different time sequence data sets, the task of correlating a yield value to a geospatial location value is accomplished via pointer management performed by the controller 201 and can be performed either in real-time as the crop is being harvested or by post-processing (for example, after the entire field has been harvested).

As noted above, the controller 201 is configured to determine a total delay time for each sampling interval as a sum of different delay components each corresponding to different physical components or sub-systems of the sugar cane harvester 101 through which the crop passes before being presented to the yield monitor sensor 217. For each segment, a behavior model is derived that approximates the physical process in order to calculate the delay component based on current measured values, historic measured values, and/or system configuration information. Accordingly, each different delay components generally falls into one of three categories: (1) constant delay (in which the delay component is constant in all situations and does not change based on the operation of the harvester 101), (2) variable delay (in which the delay component changes due to parameters that can be measured on the harvester 101), and (3) memory-based dynamic delay (in which the delay component is dependent on a series of historical states and operating conditions of the harvester 101).

One example of constant delay is the sensor processing delay indicative of the amount of time required for the controller 201 to receive or determine a value of a sensed condition (e.g., the yield value) after the condition is actual impacts the respective sensor. In some implementations, the crop processing delay component (i.e., the amount of time from when the crop is cut from the field to when the cut crop reaches the buffer basket) is also a constant delay based on system configuration; however, in other implementations, the crop processing delay component may be influenced by the ground speed of the sugar cane harvester 101. Because constant delay components and variable delay components can both be determined based on a system configuration file and/or the current value of one or more sensed operating conditions), both of these types of delay components are referred to herein as "static delay components."

In contrast, "dynamic" delay components are determined based on a series of historical states and operating conditions of the harvester 101 (e.g., historical data stored in one of the additional circular buffers in the example of FIG. 4). Examples of dynamic delay components include a buffer basket delay indicative of an amount of time that a crop remained in the buffer basket before it was drawn from the buffer basket by the elevator and an elevator delay indicative of the amount of time that the crop remained on the elevator before it reaches the field of view of the yield monitor sensor.

Figure 5:
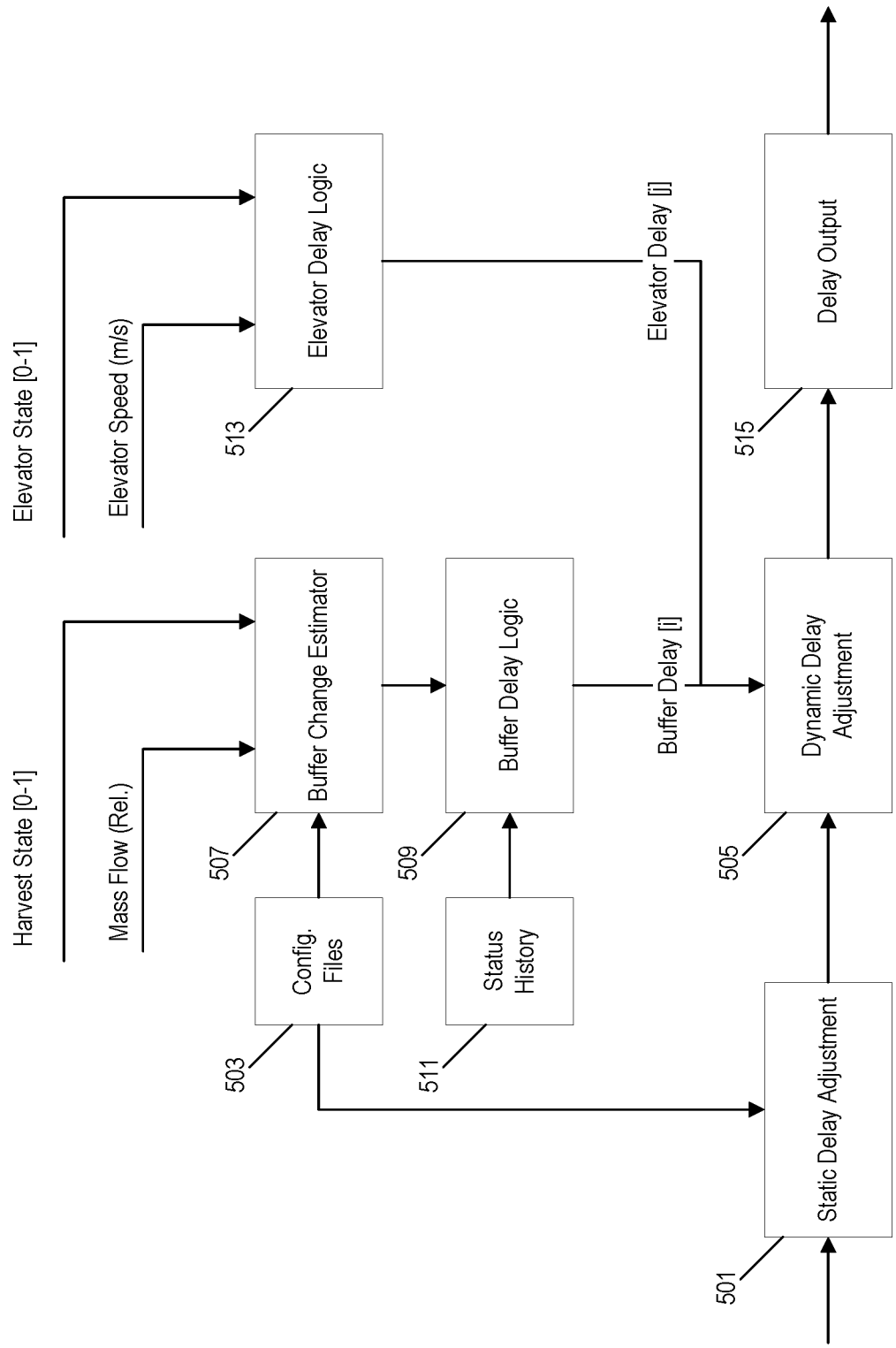
FIG. 5 is a flowchart of a method for determining an aggregate delay value for mapping sugar cane yield to geospatial location in the method of FIG. 3.

FIG. 5 illustrates an example of a method for determining a total delay amount including both static and dynamic delay components (e.g., corresponding to steps 311, 313, and 315 in the method of FIG. 3). First, the controller 201 determines the static delay adjustment (step 501) based, for example, on system configuration files 503. The controller 201 then determines a dynamic delay adjustment (step 505) based on a determined buffer delay component value ("Buffer Delay [i]") and a determined elevator delay component value ("Elevator Delay [j]"). In this example, the buffer delay component value ("Buffer Delay [i]") is a value selected from a time sequence data set of buffer delay components (at Pointer "i") and the elevator delay component value ("Elevator Delay [j]") is similarly a value selected from a time sequence data set of elevator delay components (at Pointer "j").

The controller 201 calculates a plurality of values in a time sequence data set of elevator delay component values based at least in part on a sequence of sensed elevator speed values and a sequence of elevator state values. For example, the crop must travel on the elevator for a defined distance from the buffer basket before it is within the field of view of the yield monitor sensor 217. Accordingly, each elevator delay component value is influence, not only by the elevator speed at the time when the crop is measured by the yield monitor sensor 217, but also by the elevator speed (and changes in the elevator speed) at earlier times while the crop was travelling on the elevator. For example, if the elevator is configured to operate at a constant speed, but can be turned on-and-off in order to regulate the rate at which crop is drawn from the buffer basket to the collection vessel, then each elevator delay time can be calculated by the equation:

$$d_E = \Delta + \frac{S}{V_E} \quad (1)$$

Where s is the distance on the elevator between the buffer basket and the location of the yield monitoring sensor 217, $v_E$ is the constant speed of the elevator, and $\Delta$ is the amount of time that the elevator was in the "off" state while the crop currently in the field of view would have been on the elevator.

However, the buffer delay component is influenced both by historical changes to the rate at which material enters the buffer basket and historical changes to the rate at which material is pulled from the buffer basket by the elevator. Accordingly, the controller 201 first calculates an estimated buffer change (step 507) indicative of material entering the buffer basket based on data from the system configuration files 503, a sequence of values indicator of the harvest state (i.e., whether the sugar cane harvester 101 was operating at each of a plurality of sampling interval times ("Harvest State [0-1]"), and an estimated mass flow ("Mass Flow (Rel.)"). In some implementations, the estimated mass flow is indicative of a rate at which material is entering the buffer basket and is determined based, at least in part, on the sensed ground speed of the sugar cane harvester 101, the sensed chopper pressure, and the sensed base cutter pressure. One example of such a method for estimating the mass flow is described in U.S. patent application Ser. No. 16/560,465, filed Sep. 4, 2019, entitled "INFORMATION INFERENCE FOR AGRONOMIC DATA GENERATION IN SUGARCANE APPLICATIONS," the entire contents of which are incorporated herein by reference. The controller 201 then applies a buffer delay logic (step 509) to determine the buffer delay component at each of a plurality of different times based on the output of the buffer change estimator and other status history information 511 (including the status history of the elevator operation).

Again, the elevator delay component influences the buffer basket delay component. Therefore, it may not be sufficient to determine the dynamic delay adjustment by summing the current elevator delay component value and the current buffer basket delay component. Instead, to more accurately model the total delay time, the controller 201 is configured to determine the dynamic delay adjustment by identifying a previous buffer basket delay component value (i.e., "Buffer Delay [i]") from the time sequence data set of buffer basket delay component values based on a current elevator delay component value (i.e., offsetting a Pointer for the "Buffer Delay" based on the current elevator delay component value) and then adding the current elevator delay component value (i.e., "Elevator Delay [j]") with the offset buffer basket delay component value (i.e., "Buffer Delay [i]").

The total delay time is then determined and output (step 515) by summing the total dynamic delay adjustment and the total static delay adjustment. In some implementations, both the dynamic delay adjustment (step 505) and the final data read offset (step 413, FIG. 4) are performed as part of the overall "pointer management" routine. For example, the controller 201 may be configured to store the time sequence data sets for the buffer basket delay component values and for the elevator delay component values as additional circular buffers in the example of FIG. 4 and the appropriate offset for the Buffer Basket delay component value is determined based on a current elevator delay component value as part of the process for determining the offset between the pointer for the yield values (Pointer "n") and the pointer for the geospatial location values (Pointer "m").

Although the examples described above particularly reference a sugar cane harvester 101, the methods and systems for managing and tracking delay components for use in generating a yield map can be extend to other types of crop harvesters. Furthermore, although these specific examples primarily discuss mapping crop yield values (as detected on the elevator) to geospatial locations, the methods and systems described herein can also be applied and/or extended to methods for tracking other variables at other locations on the harvester (for example, tracking crop "loss" based at least in part on changes in a fan speed).

What is claimed is:

1. A method of correcting a correlation between a geospatial location of a crop harvester and a determined yield rate value, the method comprising:
  determining, by an electronic processor, a sequence of delay values, wherein each delay value of the sequence of delay values is indicative of a total time delay from a time that a crop is cut from a field as a harvester moves across the field to a time that the crop reaches the field of view of a yield monitoring sensor, wherein determining each delay value of the sequence of delay values includes
    determining one or more static delay components indicative of portions of the total time delay that are constant or that can be determined based on instantaneous measured outputs of one or more sensors,
    determining one or more dynamic delay components indicative of portions of the total time delay that are dependent on historical operating conditions of one or more components of the harvester, wherein determining the one or more dynamic delay components includes determining the one or more dynamic delay components based at least in part on the historical operating conditions of the one or more components of the harvester, and
    determining the total delay time based at least in part on the one or more determined static delay components and the one or more determined dynamic delay components; and
  correlating, based on a determined delay value of the sequence of determined delay values, a determined crop yield value from a first stored data set indicative of a plurality of determined crop yield values to a determined geospatial location from a second stored data set indicative of a plurality of determined geospatial locations.

2. The method of claim 1, wherein determining the total delay time includes determining the total delay time as an integer multiple of a sampling frequency, and wherein correlating the determined crop yield value to the determined geospatial location includes
  selecting a first geospatial location from the first data set using a first pointer offset defined based on a first system time, wherein the first data set includes a sequential data set of geospatial locations each determined at the sampling frequency, and
  selecting a first crop yield value from the second data set to correlate to the first geospatial location using a second pointer offset defined based on the first system time and the integer multiple of the total delay time, wherein the second data set includes a sequential data set of crop yield values each determined at the sampling frequency.

3. A method of correcting a correlation between a geospatial location of a crop harvester and a determined yield rate value, wherein the crop harvester includes
  a chopper positioned at a front end of the sugar cane harvester configured to cut a sugar cane crop as the sugar cane harvester moves across a field and to chop the cut sugar cane crop,
  a buffer basket configured to receive the chopped sugar cane crop from the chopper, and
  an elevator configured to convey the chopped sugar cane crop from the buffer basket to a collection vessel, wherein the yield monitoring sensor is configured to generate an output indicative of an amount of chopped crop conveyed on the elevator,
the method comprising:
  determining, by an electronic processor, a sequence of delay values, wherein each delay value of the sequence of delay values is indicative of a total time delay from a time that a crop is cut from a field as a harvester moves across the field to a time that the crop reaches the field of view of a yield monitoring sensor, wherein determining each delay value of the sequence of delay values includes determining one or more static delay components indicative of portions of the total time delay that are constant or that can be determined based on instantaneous measured outputs of one or more sensors, determining one or more dynamic delay components indicative of portions of the total time delay that are dependent on historical operating conditions of one or more components of the harvester, and determining the total delay time based at least in part on the one or more determined static delay components and the one or more determined dynamic delay components; and correlating, based on a determined delay value of the sequence of determined delay values, a determined crop yield value from a first stored data set indicative of a plurality of determined crop yield values to a determined geospatial location from a second stored data set indicative of a plurality of determined geospatial locations, wherein determining the one or more static delay components includes determining a chopper delay indicative of a time delay from the time that the crop is cut to a time that the crop reaches the buffer basket, wherein determining the one or more dynamic delay components includes determining a buffer basket delay indicative of a time delay from the time that the crop reaches the buffer basket to a time that the crop is removed from the buffer basket by the elevator, and wherein determining the buffer basket delay includes determining a buffer basket delay based at least in part on a current operating state of the elevator and a previous operating state of the elevator.

4. The method of claim 3, wherein determining the chopper delay includes determining the chopper delay based at least in part on a sensed ground speed of the harvester.

5. The method of claim 3, further comprising determining an estimated mass flow of crop based at least in part on a sensed ground speed of the harvester, a sensed chopper pressure, and a sensed base cutter pressure, wherein the sensed base cutter pressure is indicative of a pressure resistance of the chopper while cutting the crop in the field, wherein the sensed chopper pressure is indicative of a pressure resistance of the chopper while chopping the cut crop, and wherein determining the buffer basket delay includes determining the buffer basket delay based at least in part on the estimated mass flow, the current operating state of the elevator, and a previous operating state of the elevator.

6. The method of claim 3, wherein determining the one or more dynamic delay components further includes determining an elevator delay indicative of a time delay from the time that the crop is removed from the buffer basket by the elevator to a time that the crop reaches the field of view of the yield monitoring sensor, and wherein determining the elevator delay includes determining the elevator delay based at least in part on a current operating speed of the elevator and a previous operating state of the elevator.

7. A geospatial yield mapping system for a sugar cane harvester, the sugar cane harvester including a chopper positioned at a front end of the sugar cane harvester configured to cut a sugar cane crop as the sugar cane harvester moves across a field and to chop the cut sugar cane crop, a buffer basket configured to receive the chopped sugar cane crop from the chopper, and an elevator configured to convey the chopped sugar cane crop from the buffer basket to a collection vessel, the geospatial yield mapping system comprising:

a positioning system configured to determine a geospatial location of the sugar cane harvester;

a yield monitoring sensor configured to generate an output indicative of an amount of chopped sugar cane crop conveyed on the elevator; and an electronic controller configured to:

determine a geospatial location of the sugar cane harvester and store to a memory a first data set defining a plurality of determined geospatial locations, determine a sugar cane output value based on the output of the yield monitoring sensor and store to the memory a second data set defining a plurality of determined sugar cane output values, determine a sequence of delay values, wherein each delay value of the sequence of delay values is indicative of a total time delay from a time that the sugar cane crop is cut to a time that the sugar cane crop reaches the field of view of the yield monitoring sensor, wherein the electronic controller is configured to determine each delay value of the sequence of delay values by determining one or more static delay components indicative of portions of the total time delay that are constant or that can be determined based on instantaneous measured outputs of one or more sensors, wherein the one or more static delay components include a chopper delay indicative of a time delay from the time that the sugar cane crop is cut to a time that the sugar cane crop reaches the buffer basket, determining one or more dynamic delay components indicative of portions of the total time delay that are dependent on historical operating conditions of one or more components of the sugar cane harvester, wherein the one or more dynamic delay components include a buffer basket delay indicative of a time delay from the time that the sugar cane crop reaches the buffer basket to a time that the sugar cane crop is removed from the buffer basket by the elevator, wherein the buffer basket delay is determined based at least in part on a current operating state of the elevator and a previous operating state of the elevator, and determining the total delay time based at least in part on the one or more determined static delay components and the one or more determined dynamic delay components, and correlate a determined sugar cane output values to a determined geospatial location based on a determined delay value.

8. The system of claim 7, wherein the electronic controller is configured to determine the chopper delay based at least in part on a sensed ground speed of the sugar cane harvester.

9. The system of claim 7, wherein the electronic controller is further configured to determine an estimated mass flow of sugar cane crop based at least in part on a sensed ground speed of the sugar cane harvester, a sensed chopper pressure, and a sensed base cutter pressure, wherein the sensed base cutter pressure is indicative of a pressure resistance of the chopper while cutting the sugar cane crop in the field, wherein the sensed chopper pressure is indicative of a pressure resistance of the chopper while chopping the cut sugar cane crop, and wherein the electronic controller is configured to determine the buffer basket delay based at least in part on the estimated mass flow, the current operating state of the elevator, and a previous operating state of the elevator.

10. The system of claim 7, wherein the one or more dynamic delay components further includes an elevator delay indicative of a time delay from the time that the sugar cane crop is removed from the buffer basket by the elevator to a time that the sugar cane crop reaches the field of view of the yield monitoring sensor, wherein the elevator delay is determined based at least in part on a current operating speed of the elevator and a previous operating state of the elevator.

11. The system of claim 7, wherein the electronic controller is configured to determine the total delay time as an integer multiple of the second sampling frequency, and wherein the electronic controller is configured to correlate one or more determined sugar cane output values each to a different one of the plurality of determined geospatial locations by selecting a first geospatial location from the first sequential data set using a first pointer offset defined based on a first system time, and selecting a first sugar cane output value from the second sequential data set to correlate to the first geospatial location using a second pointer offset defined based on the first system time and the integer multiple of the total delay time.

* * * * *